Nov. 10, 1942.    L. PELTIER    2,301,640
FOLDING STROLLER
Filed Oct. 17, 1940
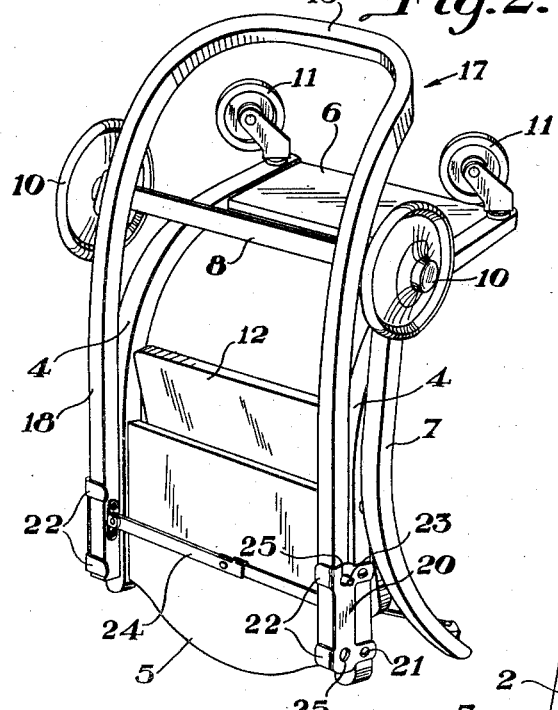
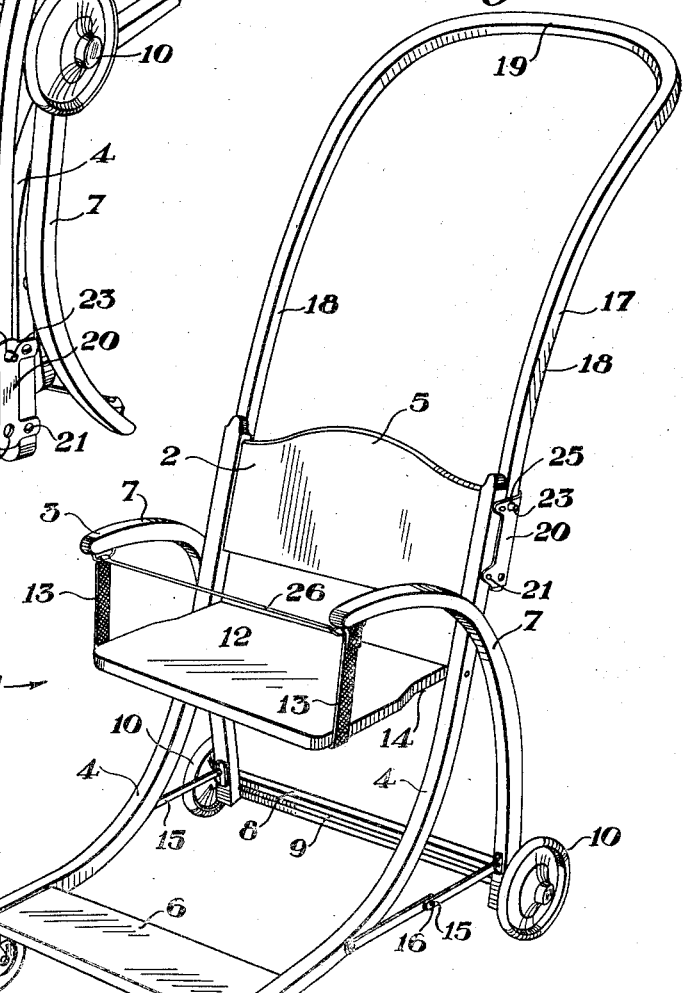
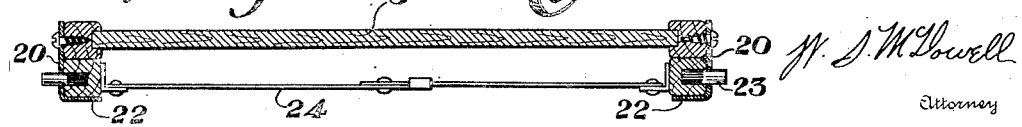
Inventor
Leslie Peltier
W. S. McDowell
Attorney Patented Nov. 10, 1942

2,301,640

UNITED STATES PATENT OFFICE 2,301,640

FOLDING STROLLER

Leslie Peltier, Delphos, Ohio, assignor to The Delphos Bending Company, Columbus, Ohio, a corporation of Ohio Application October 17, 1940, Serial No. 361,589

8 Claims. (Cl. 280—36)

This invention relates generally to juvenile furniture and is particularly directed to a stroller which may be set up for operation or folded into a relatively compact unit for storage or transportation.

The primary object of the invention resides in the provision of a stroller having a pair of hingedly united body sections, each of which carries a pair of wheels, seat means being provided in connection with the sections, and movement of the sections relative to one another serving to collapse the seat and decrease the distance between the wheels, the body having handle receiving means in which a handle may be fixed in either of two positions, the first making the handle available to guide and push the device when it is set up for operation and the other providing a trip to facilitate handling of the stroller when it is folded.

Another object resides in forming the sections with curved side bars, those of one section being disposed at the outer side of the bars of the other and being pivoted thereto, the ends of the outer bars projecting forwardly beyond the inner bars and serving to support the forward portion of a seat which is pivotally connected at the back to the inner section, the lower ends of the sections having ground engaging wheels carried thereby, pivotal movement of the sections serving to adjust the seat and wheels so that the device may be operated or to position them in such relation that the device will require a minimum amount of space.

A further object rests in providing one of the sections above mentioned with handle receiving means in which the handle may be disposed in different positions, the handle extending away from the body when in one of the positions and alongside the body when in the other. The first position is employed when the body is adjusted for active use and the latter when the body is folded.

A still further object resides in constructing the handle with a pair of spaced lower ends which are relatively flexible and are receivable within socket means carried by the stroller body, means also being carried by the handle whereby the lower ends may be manipulated after being disposed in the sockets to positively lock the handle in operative positions, the construction of the socket and locking means being such that a rigid connection between the handle and the body will result when the lock is properly set.

For a further understanding of the invention, reference may be had to the following description and the accompanying drawing, in which the invention has been illustrated in its preferred form.

In the drawing:

Fig. 1 is a perspective view of a folding stroller formed in accordance with the present invention, the device being set up for active operation;

Fig. 2 is a similar view showing the device folded for storage or transportation;

Fig. 3 is a horizontal sectional view taken through one section of the frame of the device showing the separable connection between the frame and the handle.

Referring more particularly to the drawing, the stroller comprises a body 1 having a pair of sections 2 and 3. The first or primary section includes a pair of curved side bars 4 maintained in spaced relation by a back rest 5 and a foot rest 6, these members being disposed between the opposite ends of the side bars. The secondary section 3 has a pair of curved side bars 7 disposed on the outer sides of the side bars 4 and pivotally connected thereto at registering points adjacent to the back rest.

When the device is set up for operation, the side bars 4 are so arranged that a straight section of these bars extends substantially vertically and supports the back rest while straight sections at the other ends of the bars extend horizontally and support the foot rest in a plane below the back rest. The bars 7 are so connected to the primary frame that one end of each projects forwardly from the primary frame and the opposite ends extend downwardly into substantial registration with the lower sections of the side bars 4.

The lower ends of the bars 7 are spaced by a transversely extending brace 8 which serves to tie the bars together to form a rigid unit. The brace has a longitudinally extending slot formed therein to receive an axle 9, this member being clamped in place when the brace is secured to the bars 7. A pair of ground engaging wheels 10 are journalled on the ends of the axle. The under sides of the lower ends of the members 4 are provided with wheels 11, these being of the caster type in order to permit the stroller to be steered or turned while moving over a roadway.

Slightly below the point of connection of the members 4 and 7, the former have a seat 12 pivotally connected therewith, this member being flat and having its forward portion flexibly connected with the forward ends of the bars 7 by tapes 13. The sides of the seat 12 are recessed as at 14 to slightly reduce the width of the seat where it extends between the bars 4, the width at the forward portion being such that the straps 13 will be nearly vertical when the stroller is operatively positioned.

As the bars 4 and 7 are pivotally connected, they may move relative to one another from the position shown in Fig. 1 to that shown in Fig. 2. When this operation is performed, the wheels 10 and 11 will be moved into closer relationship and the seat 12 will be moved to a position wherein it is substantially flat against the back rest. To hold members 4 and 7 in such relation that the seat will be horizontal, a pair of jackknife braces 15 are connected between the lower ends of the side bars, the ends of the braces being pivotally connected with the side bars in order that when the braces are folded at their pivots 16, the frames will be swung to fold the body.

To facilitate the operation of the stroller, a handle 17 has been provided which is substantially U-shaped and has a pair of side arms 18 curved intermediately of their ends and connected at one end by a transversely extending section 19. When the body of the stroller is operatively disposed, the spaced ends of the handle may be positioned in sockets provided by bracket members 20 secured to the upper ends of the side bars 4 by screws or other suitable elements 21. The members 20 are fastened to the outer sides of the bars 4 and extend rearwardly, terminating in inwardly directed flanges 22 spaced from the rear surfaces of the bars 4 a distance sufficient to receive the ends of the arms 18. Longitudinal movement of the arms in the sockets is prevented by prongs 23 which are carried by the arms and project through perforations formed in the members 20. To insure the positioning of the prongs in the perforations, the lower ends of the bars 18 have a jackknife brace 24 extending therebetween. This member serves to spread the ends of the members 18 when it is fully extended.

If it is desired to remove the handle, the brace 24 may be collapsed to shorten the distance between its ends and this operation will move the ends of the members 18 toward one another, withdrawing the prongs 23 from the openings. A pair of openings are provided in each bracket, the openings being adjacent to the ends of the brackets. As disclosed in Fig. 2, the prongs are spaced from the ends of the members 18 a slight distance so that portions of the arms will extend into the sockets beyond the point of connection provided by the prongs.

After the handle has been removed, the body may be collapsed by folding the braces 15. This operation will decrease the amount of space required by the body so that it will be more readily stored or transported. When the body is so folded, the handle may be connected therewith to facilitate movement thereof from place to place. When the handle is connected with the folded body, it is inserted in the socket from the opposite end and will then extend in the same general direction as the side bars of the body section. The handle may be secured in the sockets by moving the jackknife brace 24 to an extended position where the prongs 23 will project through the second set of openings in the brackets. The ends of the brackets are slightly flared as at 25 in registration with the sockets to facilitate the operation of placing the handle in the sockets.

By reversing the handle when it is connected with the folded body, the wheels will be disposed upwardly and the unit can be transported without danger of having the wheels engage floors or other surfaces which they might mar. The folded unit may be rested on the lower end where it will remain in a substantially upright position.

From the foregoing, it will be apparent that a stroller has been provided which may be set up for operation or folded into a compact unit suitable for storage or transportation. The stroller has a body section, and a handle section which may be secured to the body section in either of two positions, in the first of which, the handle will constitute an extension of the side bars of the frame and in the latter, will project in the same direction as the side bars. A strap 26 extends between the forwardly projecting ends of the side bars 7 to retain the infant in the seat when the device is set up. From Fig. 1, it will be noted that the forwardly projecting ends of the members 7 serve a dual purpose in that the seat is supported in a horizontal position and the portions of the members between the point of connection of the seat and the bars 4 may be used as arm rests.

While the invention has been illustrated in its preferred form, it is obvious that many minor changes may be made in the shape and relation of parts without departing from the spirit and scope of the invention as set forth in the following claims.

What is claimed is:

1. A folding stroller comprising a pair of frame members hingedly connected intermediate of their ends, a pair of wheels carried by each frame member, rigid seat means pivotally connected to one frame member and flexibly suspended from the other, registering handle-receiving brackets secured to one of said frame members, said brackets being formed to hold a handle in two positions, and a handle connected with the frame member provided with said brackets, said handle having spaced flexible ends removably disposed in said brackets, and means for locating and securing said handle in said brackets.

2. A folding stroller comprising a pair of frame members, back and foot rests carried by the first of said members adjacent to the ends, said members being pivotally connected between said back and foot rests, ground engaging wheels carried by said members, seat means supported by said members between said back and foot rests, registering handle-receiving brackets carried by said first member adjacent to said back rest, and handle means formed for reception by said brackets, said handle being insertable in said brackets from two positions, the first when said stroller is opened for use and the second when said device is folded.

3. A folding stroller comprising a pair of frame members having curved side bars, back and foot rests carried by the first of said members adjacent to the ends, said members being pivotally connected between said back and foot rests, ground engaging wheels carried by said first member adjacent to said foot rest and by said second member adjacent to one end, the opposite end of said second member projecting in front of said first member, seat means pivotally connected at the rear to said first frame and flexibly suspended from the forward end of said second frame, registering handle-receiving brackets carried by said first member adjacent to said back rest, and handle means formed for reception by said brackets, said handle being insertable in said brackets from two positions, the first when said stroller is opened for use and and the second when said device is folded.

4. A folding stroller comprising a pair of frame sections having curved side bars, back and foot rests carried by the first of said sections, the side bars of the second section being positioned on the outer sides of those of the first section and pivotally secured thereto adjacent to the back rest, a pair of ends of the side bars of the second section extending forwardly beyond the pivotal connection and constituting arm rests, seat means pivoted to the first section below said back rest, flexible means connecting said seat to the forwardly projecting ends of the second section, wheel means journaled at the lower ends of said sections, means for limiting the pivotal movement of said sections, means carried by said first section to provide handle-receiving sockets extending longitudinally of the side bars of said first section adjacent to the back rest, and a handle formed for reception by said sockets, said handle being insertable in said sockets from two positions and operating as an extension of the side bars of the first section when disposed in one position and as a carrying handle when in the other position.

5. A folding stroller comprising a pair of sections having curved side bars, said sections being pivotally connected intermediate of the ends, seat, back and foot rest means carried by said sections, wheels journaled at one end of each section, relative pivotal movement of said sections in one direction serving to increase the distance between the wheels and set the stroller for operation, means for limiting the degree of pivotal movement of the sections, a handle curved intermediate of its ends, and means for securing said handle to one of said sections in either of two position, said handle extending in a direction opposite that of the side bars of one section when in one positioon and in the same direction as said side bars when in the other position.

6. A folding stroller comprising a pair of frame sections having curved side bars, back and foot rests carried by the first of said sections, the side bars of the second section being positioned on the outer sides of those of the first section and pivotally secured thereto adjacent to the back rest, a pair of ends of the side bars of the second section extending forwardly beyond the pivotal connection and constituting arm rests, seat means pivoted to the first section below said back rest, flexible means connecting said seat to the forwardly projecting ends of the second section, wheel means journaled at the lower ends of said sections, and means for limiting the pivotal movement of said sections.

7. A light weight folding vehicle for children comprising a pair of frame sections having side bars, foot and back rest means extending between the end portions of the side bars of the first section, means pivotally joining the side bars of said sections, seat means pivotally joined with the first of the sections and flexibly connected with the other, wheel means carried by each section, a handle, and means for securing the handle in different positions to said first section, said handle extending away from the wheels on said section when in one position and toward the wheels when in another position.

8. In a folding vehicle for children, a body having a pair of sections hingedly connected for folding movement, spaced foot and back rests provided on the first of said sections, seat means connected to said first section between said foot and back rests, means connecting said seat means to said second section to maintain said seat in horizontal order when said sections occupy one position of adjustment, bracket means secured to said first section, said bracket means having a plurality of sockets, handle means positioned in said brackets, and projections provided on said handle means for reception by said sockets, said handle serving as an extension of said first frame section when said projections are in certain of said sockets and being substantially coextensive with said first section when the projections are in the other sockets.

LESLIE PELTIER.